M. J. DAVIDSEN.
BELT CONTROLLER AND TIGHTENER.
APPLICATION FILED AUG. 24, 1905.
936,094.
Patented Oct. 5, 1909.
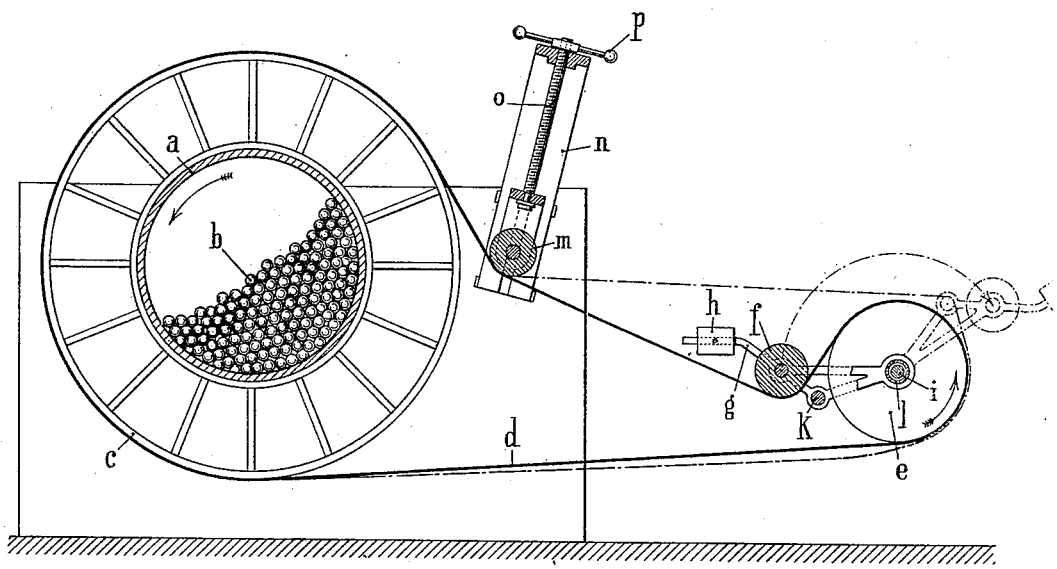

UNITED STATES PATENT OFFICE.

MEYER JOSEPH DAVIDSEN, OF PARIS, FRANCE.

BELT CONTROLLER AND TIGHTENER.

936,094.

Specification of Letters Patent. Patented Oct. 5, 1909.

Application filed August 24, 1905. Serial No. 275,523.

*To all whom it may concern:*

Be it known that I, MEYER JOSEPH DAVIDSEN, a citizen of the Kingdom of Denmark, residing at 5 Rue Fénelon, Paris, France, engineer, have invented certain new and useful Improvements in Belt Controllers and Tighteners, of which the following is a specification.

This invention relates to a belt controller and tightener, which is particularly adapted to be used in connection with crushing machines such as are provided with rotary drums operated by means of drive wheels and endless belts.

The principal object of the invention is to combine improved belt controlling and automatic as well as adjustable tightening means with a machine of the character specified.

Further objects of the invention will appear as the description proceeds.

The accompanying drawing, forming part of this specification, represents a vertical section through a crushing machine equipped with the improvements of my invention.

Referring to the drawing, the letter $a$ designates the rotary drum which is partially filled with balls, stones or other suitable crushing devices $b$. Secured to the drum $a$ in any suitable manner, is a belt wheel $c$ which preferably is larger in diameter than the drum. Fitted around the belt wheel $c$ is an endless belt $d$ which is suitably operated to rotate the drum $a$. by means of a drive wheel $e$. Pivotally connected in any suitable manner with the axle $i$ of the drive wheel $e$ is a lever $g$ which is preferably given the shape of an irregular triangle, as shown in the drawing, and is formed with a suitable handle on which is mounted a weight $h$. The lever $g$ is provided with a relatively large roller $f$ located above or outside the belt $d$ and a relatively small roller $k$ located below or inside the belt, the two rollers being employed for controlling and tightening the belt, as will hereafter appear. Adjacent to the periphery of the belt wheel $c$ is a roller $m$ which bears against the belt $d$ and is adjustably mounted in a frame $n$ by means of a screw $o$ having a handle $p$.

The operation of the device is as follows: When the drive wheel $e$ is first started in the direction of the arrow, the lower portion of the belt $d$ is stretched or straightened as indicated by the full line in the drawing. The upper portion of the belt then would become loose and liable to slip on the drive wheel if it were not that the roller $f$ automatically takes up the slack. When the drum $a$ is running at normal speed the lower portion of the belt sinks into the dotted line position, the roller $f$ giving up the necessary slack. When it is desired to control the belt to stop the movement of the drum, the lever $g$ is thrown into the dotted line position so that the belt rests on the roller $k$ and has so little frictional contact with the periphery of the drive wheel $e$ that it cannot be operated thereby, whereby it will be apparent that the movement of the drum is controlled by the combined automatic belt tightener and controller lever $g$ with the rollers $f$ and $k$. It will be apparent furthermore that while the lever $g$ with the rollers $f$ and $k$ acts as a combined belt controller and automatic tightener, the roller $m$ acts as an adjustable belt tightener to take up permanent slack caused by stretching.

Having thus particularly described the invention, what is claimed as new is:—

The combination with a belt pulley and belt of a weighted lever freely movable about the axis of the pulley, a roller carried by said lever outside of the belt and adapted to increase the arc of contact of the belt with the pulley under the action of the weighted lever, and a second roller also carried by the same lever inside of the belt and adapted to reduce the arc of contact of the belt with the pulley when the lever is swung back, whereby the movement of the lever about the axis of the pulley places the belt under tension or frees it from the pulley as the case may be.

In testimony whereof I have signed this specification in the presence of two subscribing witnesses.

MEYER JOSEPH DAVIDSEN.

Witnesses:
JOHN BAKER,
HANSON C. COXE.